Figure 1:
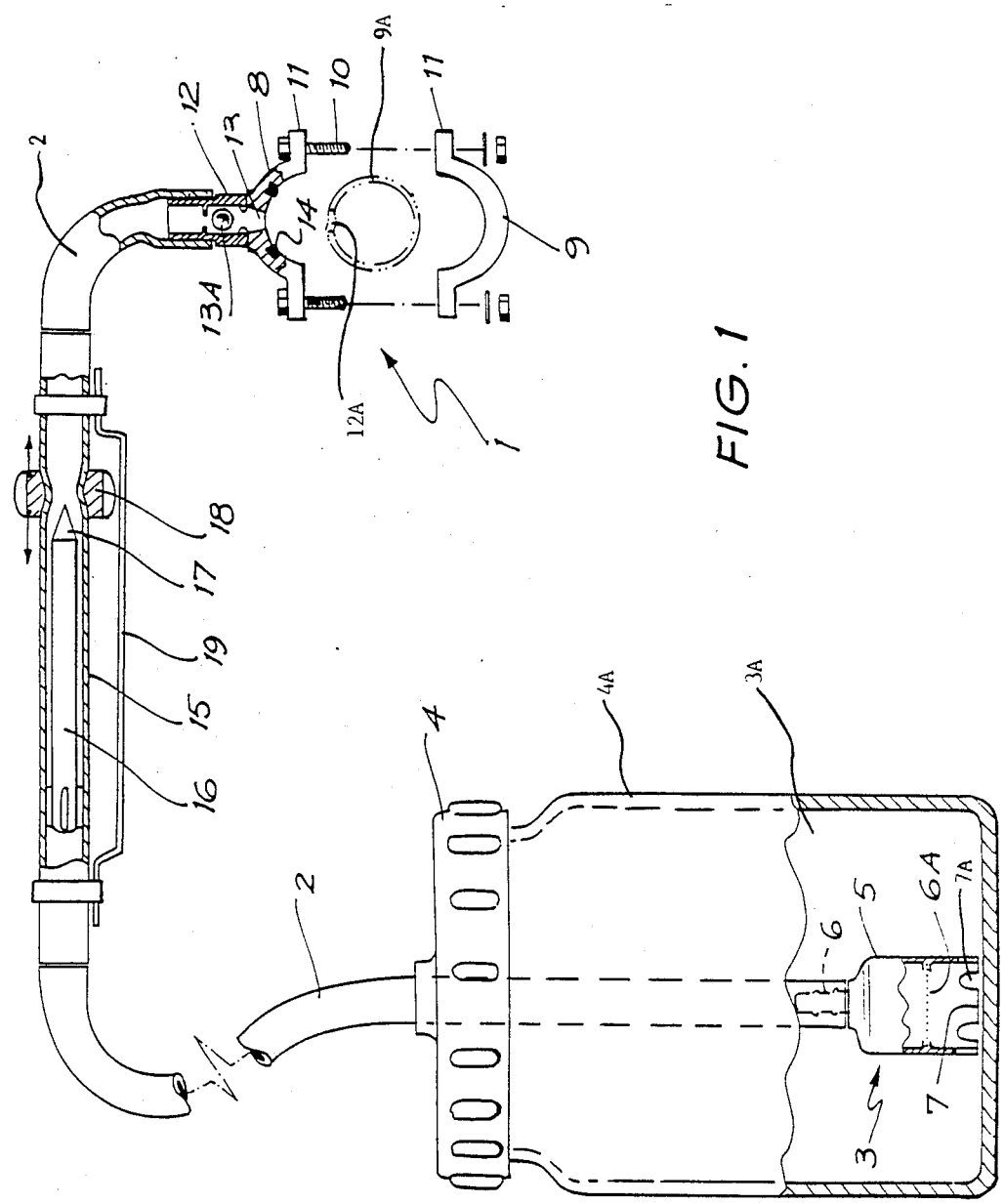

United States Patent [19]
Costa

[11] Patent Number: 4,789,003
[45] Date of Patent: Dec. 6, 1988

[54] WATER TREATMENT APPARATUS

[76] Inventor: Norman J. Costa, 73A Saunders Bay Road, Caringbah, New South Wales 2229, Australia

[21] Appl. No.: 86,095
[22] PCT Filed: Oct. 31, 1986
[86] PCT No.: PCT/AU86/00335
§ 371 Date: Jul. 2, 1987
§ 102(e) Date: Jul. 2, 1987
[87] PCT Pub. No.: WO87/03111
PCT Pub. Date: May 21, 1987

[30] Foreign Application Priority Data

Nov. 7, 1985 [AU] Australia ............... PH3281

[51] Int. Cl.⁴ ........................... G05D 11/03
[52] U.S. Cl. ................... 137/605; 210/169; 251/146; 251/209
[58] Field of Search ............... 137/605; 251/146, 209; 210/169

[56] References Cited

U.S. PATENT DOCUMENTS

| | | | |
|---|---|---|---|
| 2,424,328 | 7/1947 | Pars | 251/209 |
| 3,180,580 | 4/1965 | Schedel | 239/318 |
| 3,347,267 | 10/1967 | Inman | 251/146 X |
| 3,417,780 | 12/1968 | Lienard | 251/146 X |
| 3,822,017 | 7/1974 | Rast | 210/169 X |
| 4,224,154 | 9/1980 | Steininger | 210/169 X |
| 4,363,728 | 12/1982 | Guglielmi | 210/169 X |

FOREIGN PATENT DOCUMENTS

| | | |
|---|---|---|
| 21709 | of 1925 | Australia. |
| 4178 | 9/1932 | Australia. |
| 13083 | 6/1934 | Australia. |
| 141145 | 6/1949 | Australia. |
| 150118 | 6/1951 | Australia. |
| 167778 | 12/1954 | Australia. |
| 220325 | 10/1957 | Australia. |
| 229012 | 10/1958 | Australia. |
| 251052 | 10/1962 | Australia. |
| 427028 | 3/1971 | Australia. |
| 463061 | 2/1974 | Australia. |
| 500604 | 11/1976 | Australia. |
| 472100 | 3/1951 | Canada .............. 251/146 |
| 2218840 | 4/1972 | Fed. Rep. of Germany ...... 251/209 |

OTHER PUBLICATIONS

Australian Patent Abstract #66,826/81; C. R. Fletcher et al; Feb. 1980.

Primary Examiner—Robert G. Nilson

[57] ABSTRACT

Apparatus for selectively introducing an additive into a conduit fluid stream, said apparatus comprising an intake means (29A) for drawing said additive from a supply thereof, a metering device (28) for selectively regulating the amount of said additive introduced and a clamp (20) which in use engages a conduit (21) and includes means (36) for dispensing said additive through said conduit wall and into the fluid stream.

7 Claims, 5 Drawing Sheets

WATER TREATMENT APPARATUS

This invention relates to apparatus for selectively metering chemicals into fluid systems. More particularly although not exclusively it is intended for use with swimming pools or agricultural irrigation systems.

In order to control the growth of algae and other disease causing organisms in swinning pools or water slides etc. it is necessary to maintain a minimum concentration of anticeptic chemicals such as chlorine in the water. These chemicals are normally available in the forms of powders, slow dissolving pellets or concentrated liquids. While the use of liquids is becoming more prevalent due to ease of mixing and the absence of any residue (which results from pelletized or powdered chlorine) this has required the installation of expensive electrically powered pumps and metering equipment if the amount of chemical in the water is to be conveniently maintained at the required level.

Similarly in many irrigation systems it is often necessary to accurately dispense relatively small volumes of chemical additives into the water supply and until the present invention has also required the installation of expensive externally powered metering equipment.

With the object of ameliorating this disadvantage the invention according to one aspect discloses apparatus for selectively metering liquid chemical additives into swimming pools or irrigation water systems without the requirement of any additional external power.

Preferably such apparatus comprises conduit means adapted at one end for insertion into a supply of said liquid chemical, a clamp means for connecting the other end of said conduit to the intake line of a water pump or the like and a restricting means for selectively metering the flow of said liquid chemical through said conduit.

Figure 2:
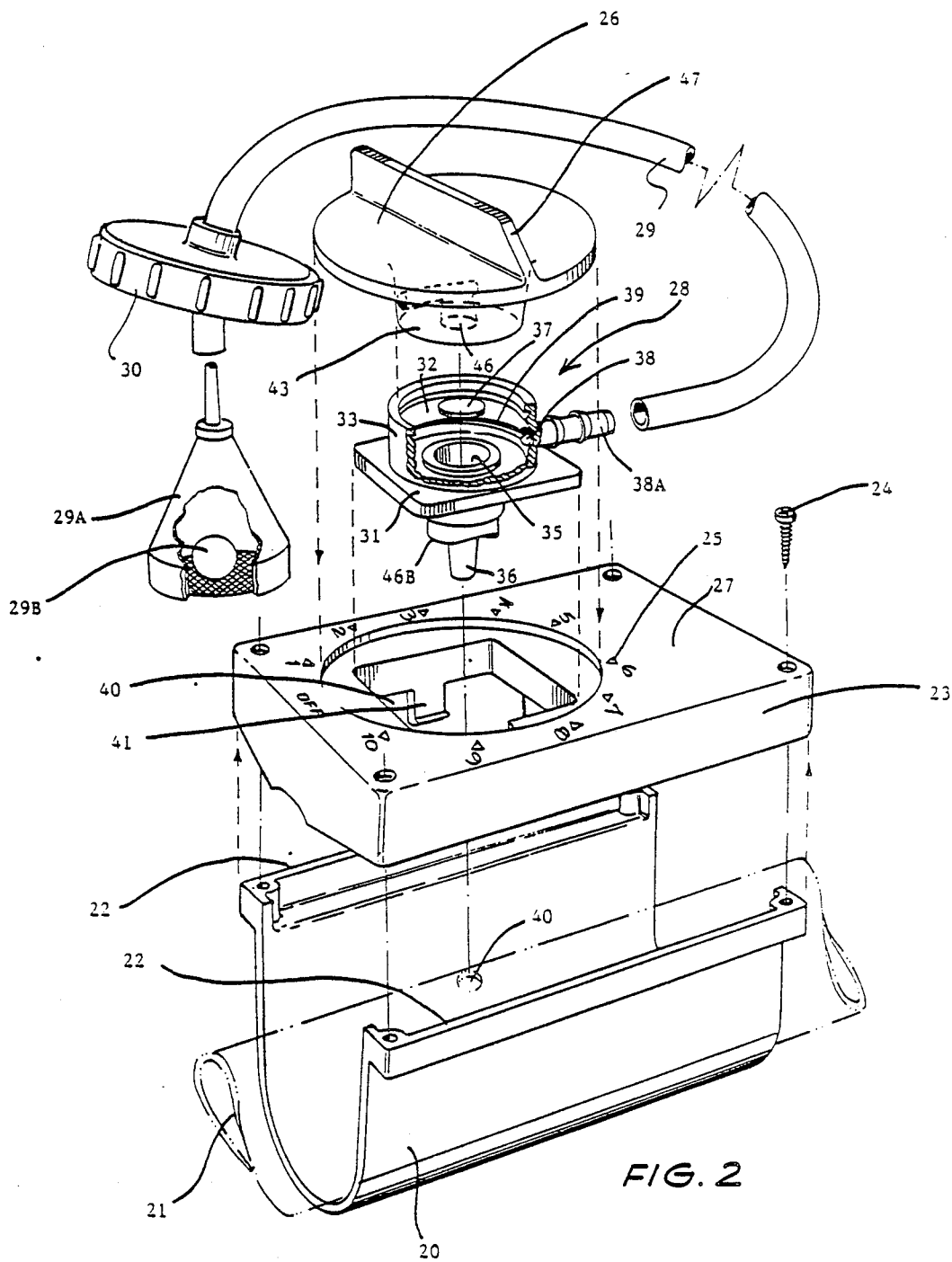
Figure 3:
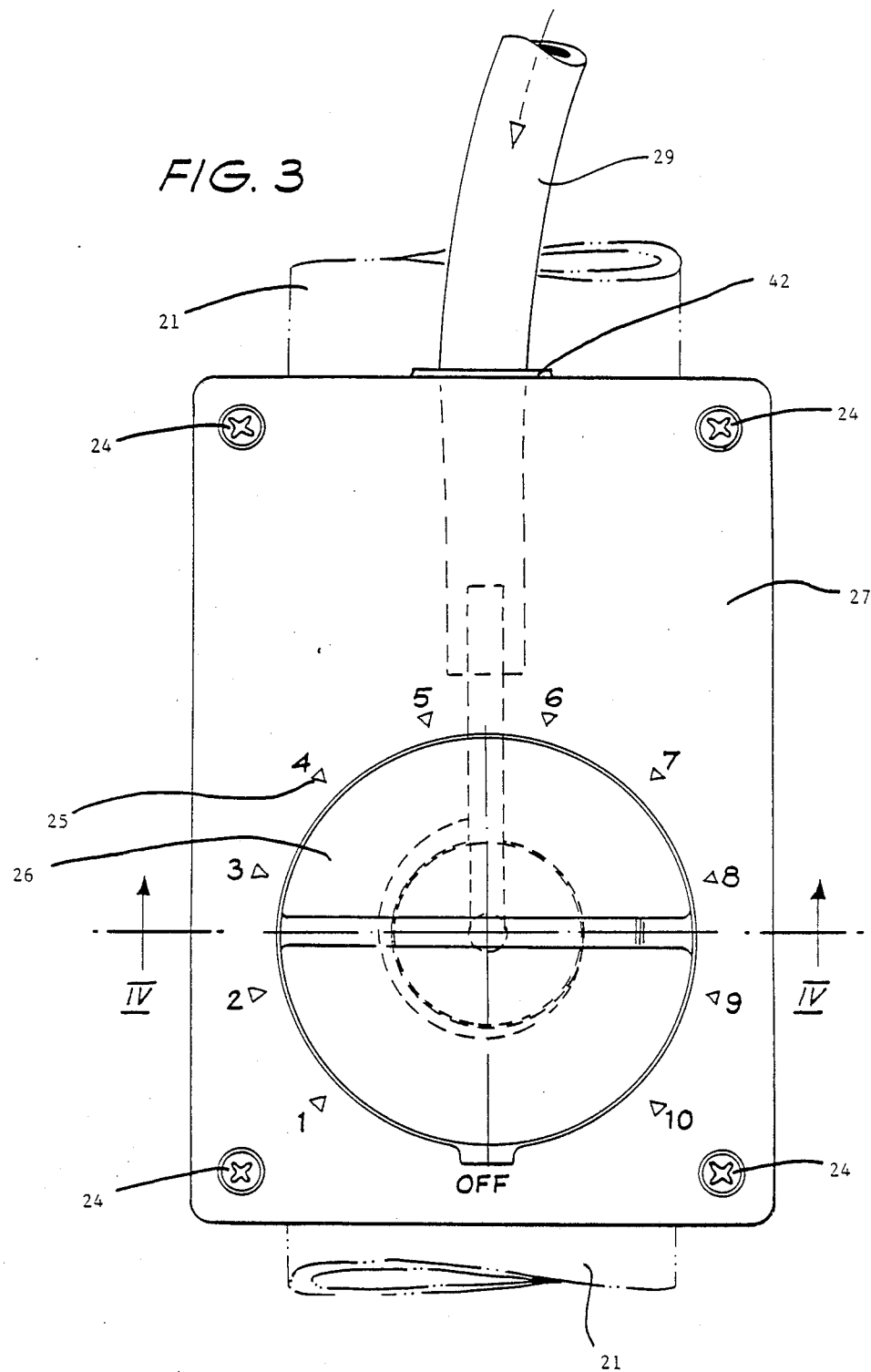
Figure 4:
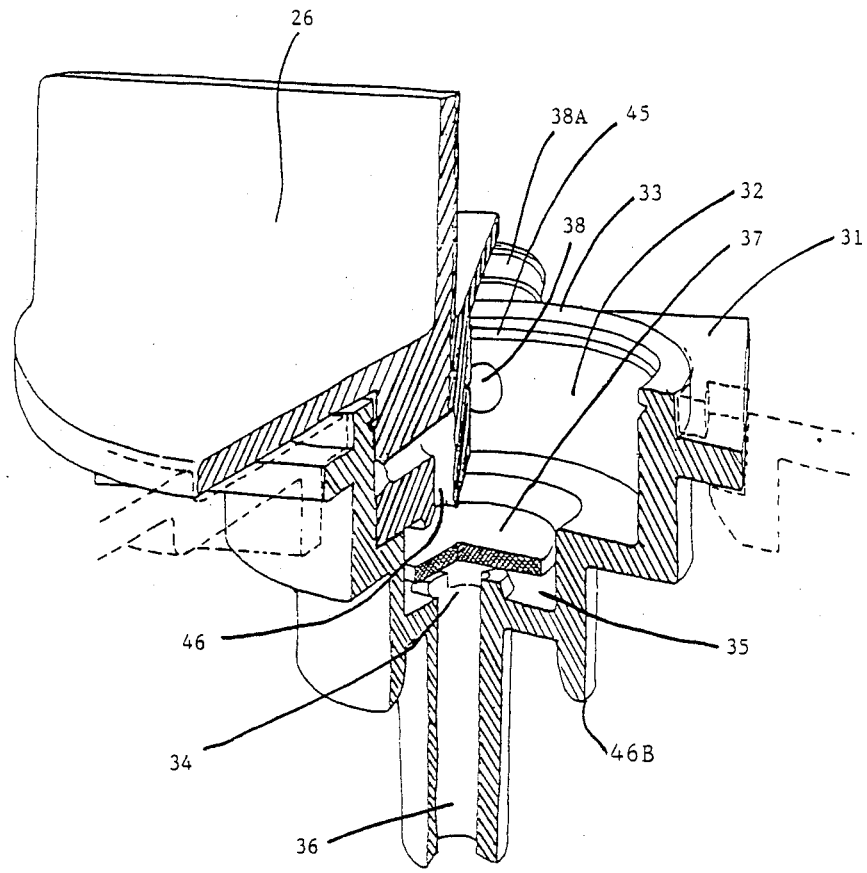
Figure 5:
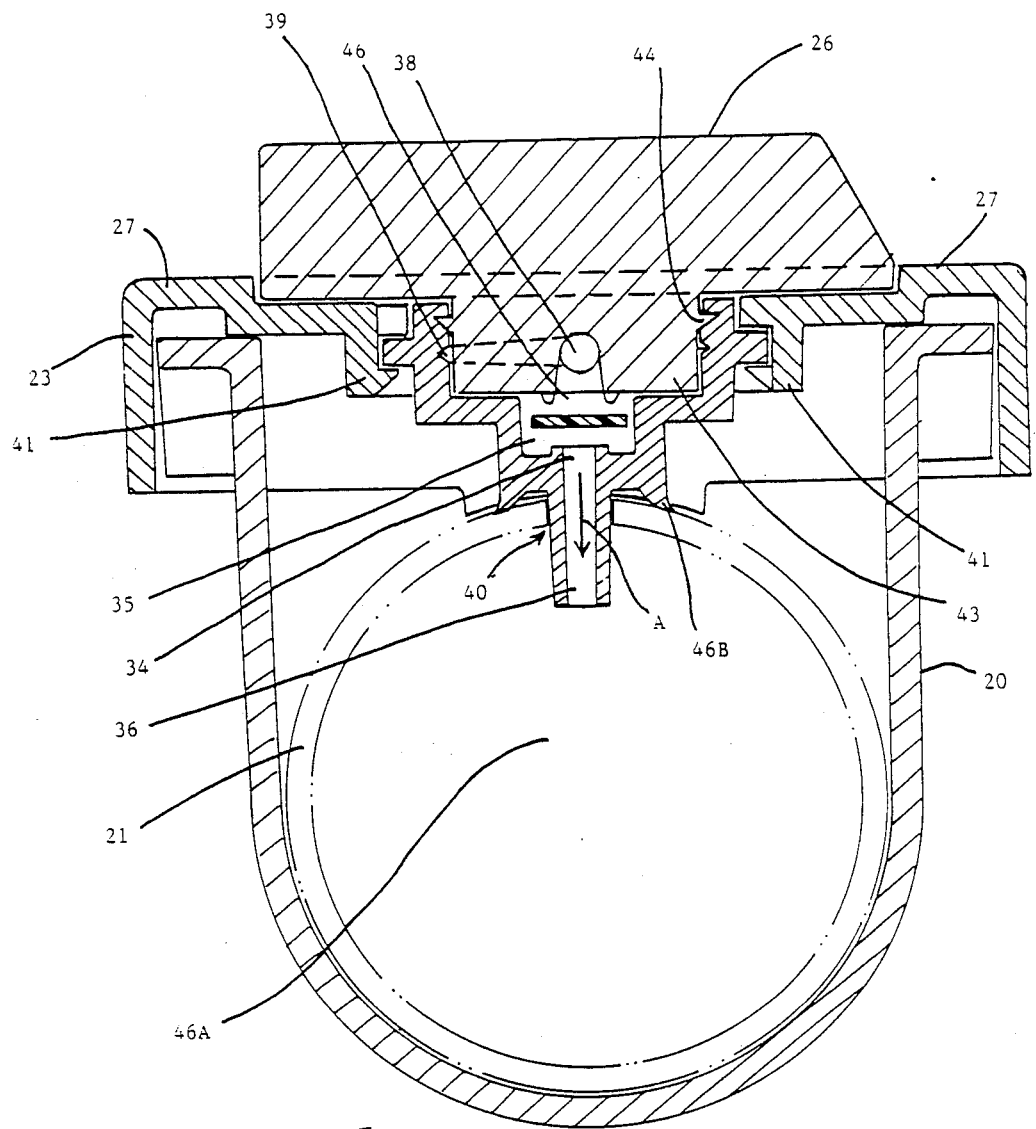

Two currently preferred embodiments of this invention will now be described with reference to the attached drawings in which:

FIG. 1 shows a schematic view in partial crosssection of one form of liquid chlorine dispensing apparatus according to this invention, FIG. 2 is an exploded view of a second form of liquid chemical dispensing apparatus, FIG. 3 is a plan view of the assembled dispensing apparatus of FIG. 2, FIG. 4 is a sectional view of part of the apparatus of FIG. 2, and FIG. 5 is a cross-sectional view along the lines IV—IV of FIG. 3.

Referring first to FIG. 1 the apparatus basically comprises a pipe clamp 1 and plastic tubing 2 which connects this clamp to an intake housing 3 for insertion into a supply of liquid chlorine 3A. A threaded cover 4 is also fitted around the tube. This cover is designed as a closure for liquid chlorine containers 4A of the size sold for domestic or commercial use so that after their initial opening and insertion of the tube these receptacles can again be sealed against accidental spillage or the ingress of foreign matter.

The intake for the apparatus consists of a hollow bell shaped casing with a nipple 6 adapted for insertion into the end of the plastic tube 2. A screen 6A is located up from the rim 7. This rim may have notches 7A cut through it to ensure a free flow of liquid up through the screen when it is resting on the bottom of the chlorine container. Weights may also be inserted within this casing to overcome any natural buoyancy or curvature of the tube and ensure that the intake screen sits properly on the bottom of the container.

The clamp 1 at the other end of the tube basically comprises a set of saddle members 8 and 9 which are adapted to embrace the vacuum or intake pipe 9A of a swimming pool pump (not shown). Bolts 10 extend through flanges 11 on each side of these saddle members so that they can be tightened securely around this pipe. The tube 2 leads into the upper saddle member 8 through a connector fitting 12 of any suitable design so that the liquid chlorine can flow from the tube through an orifice 13 in this member. A non-return valve 13A is also located within the fitting 12 to prevent any reversal of flow back through the tube.

Prior to attaching the clamp 1 in place a hole 12A of approximately 6 to 9 mm diameter is drilled in the vacuum pipe 9A and the saddle member 8 is located so that this hole is axially aligned with the orifice 13. A circular groove is preferably formed around the orifice to seat an "O" ring 14 which seals against the exterior wall of the vacuum pipe and prevents leakage at this point.

A metering device is also located in the flow line. In this case such device is positioned adjacent the fitting 12 and comprises a separate section of conduit 15 with an elongated plug 16 disposed therein. The diameter of this plug is slightly less than the interior of the conduit 15 to allow the chlorine to pass and its down stream end 17 is tapered to a point. An exterior close fitting collar 18 is also provided which can be moved over the length of the conduit 15 to urge the interior surface thereof against the plug and thus selectively and precisely limit the flow of liquid through the device. With an average size swimming pool of say 45,000 liters the flow rate should preferably be adjustable to allow approximately 500 to 700 ml. of liquid chlorine to enter the pool during the daily operating period of the pump.

With this embodiment the ends of the conduit 15 have also been clamped to a metal strap 19 to prevent any undue flexing which could disrupt the flow adjustment.

As mentioned above this apparatus is installed by connecting it between a supply of liquid chlorine and the intake pipe of a swimming pool pump with the orifice 13 being aligned over a suitably placed hole in this pipe. Subsequent operation of the pump produces a substantial pressure difference between the interior of this pipe and atmosphere with the result that the chlorine is automatically drawn from the supply container through the metering device and into the water circulation system of the pool. During its operation the volume flow of the chemical can be precisely regulated according to pool size and the running time of the pump by adjusting the position of the collar 18.

A second embodiment of this invention is shown in FIGS. 2 to 5. in this case the clamp means comprises a single U shaped saddle member 20 which is adapted to closely embrace the intake pipe 21 of a swimming pool or irrigation water pump. The upper edges 22 of the saddle member interfit with a rectangular housing 23 in the manner shown by means of four screws 24. This housing may be generally rectangular in shape with a dial 25 and control knob 26 set into the upper face 27. A metering unit designated generally as 28 is located within the housing below this knob and connects with a supply tube 29 leading from an intake filter housing 29a which in turn is inserted into a reservoir (not shown) of liquid chlorie or other chemical. This filter housing is of generally similar construction to that of the first example with a weight 29B being disposed inside to ensure that it sits properly on the bottom of the chemical reservoir. A closure cap 20 may also be fitted over the tube 29 to seal off the reservoir after insertion of said filter housing.

The preferred construction of this metering unit is best shown in FIGS. 2, 4 and 5. It comprises a square base 31 with a cavity or recess 32 defined on its upper surface by a circular wall 33. An orifice 34 leads from a well 35 in the bottom of the recess down through an open ended conduit 36. A washer or disk 37 may be located in this well immediately above this conduit to ensure that flow can only occur in the downward direction as indicated by arrow "A" in FIG. 5. A second orifice 38 leads in through the wall 33 and is connected to supply tube 29 by means of a nipple 38A which is push fitted into this tube. As best shown in FIG. 2 a tapered groove 39 is also formed halfway up the inside surface of wall 33 and extends from orifice 38 around through approximately 290 degrees of the internal wall surface. With this embodiment the groove is V shaped in cross-section and has a maximum depth and surface width of about 1 mm at orifice 38. Its cross-section however tapers uniformly to zero at the opposite end.

The base section 31 is shaped to fit into a rectangular aperture 40 in the housing and sits between hooks 41 on each side. Although not apparent from the exploded view in FIG. 2 this construction enables the base to be readily snap fitted into place from the underside of the housing with the supply tube 29 extending out through an aperture or channel (not shown) in one of the end walls 42.

The remaining part of the metering unit comprises a circular spigot 43 which is preferably moulded in one piece with the control knob 26. This spigot is adapted to be a close tolerance push fit into the circular recess 32 so as to sealingly abut the internal surface of the wall 33. Once inserted it is held in place by an annular rib 44 which engages in a mating groove 45 around the upper inside surface bottom of the spigot and then at a right angle to one side so as to open out at a point coinciding with the groove 39. By rotating the spigot in relation to the base 31 and housing 23 this bore can thus be brought into communication with any segment of the groove or alternatively isolated from it altogether. As shown in the cross-sectional view of the assembly (FIG. 5) the other end of this bore 46 leads into the well 35 and thence to conduit 36.

In use the housing 23 is clamped over the intake pipe 21 of a swimming pool or irrigation water pump so that the conduit 36 extends down through a hole 40 in the pipe wall to complete the flow path for the chemical from the supply reservoir to the main water stream 46A. In order to prevent leakage around this hole a concentric ridge 46B may also be formed on the base which bites into and seals against the outside of the pipe. Operation of the pump causes a reduction in pressure in the pipe 21 with the result that the chemical is drawn through the tube 29 and metering unit and into pipe 21. By rotating the control knob 26 however the volume of chemical dispensed can be precisely regulated through a range of values from a maximum when the bore 46 is aligned with the enlarged end of the groove 39 adjacent the orifice 38 to a minimum when the spigot is turned so that the bore communicates only with the reduced cross-section at the opposite end. Further rotation of the control knob and spigot to the "off" position serves to isolate the bore 46 from the groove and thus completely terminates chemical flow. As shown in FIG. 2 the control knob 26 is preferably designed with a pointer 47 which can be used to preselect the flow volume in say ml. per minute against the calibrated dial 25 on the surrounding face of the housing.

It will thus be appreciated that this invention at least in the form of the embodiments described provides a novel and unique apparatus for accurately dispensing chemicals into water supply or circulation systems such as those used with irrigation or swimming pool installations. Clearly however the particular examples disclosed are only the currently preferred forms of this invention and a wide variety of modifications may be made within the scope of the invention which would be apparent to a man skilled in the art. For example the shape and configuration of the clamp, metering unit and housing could be varied according to design preference or the requirements of any particular installation. It is also to be understood that while the invention has been described with specific reference to swimming pool and agricultural irrigation systems this concept may in fact be adapted to any other industrial or domestic application where precisely regulated amounts of chemical additive are dispensed into a fluid system. While an ultraviolet stabilised plastic is currently preferred for constructing the described apparatus the invention is expressly not limited to any particular material.

The claims defining the invention are as follows:

1. Apparatus for introducing an additive into a conduit fluid system without the requirement of any additional external power, said apparatus including an intake means for drawing the additive from a supply thereof, a metering unit comprising a spigot which is rotatable within a seat to bring a bore into communication with a section of tapered groove whereby the relative position of said bore along the length of said groove determines the amount of additive passing through said unit and a clamp which in use embraces the conduit and includes means for dispensing the additive through said conduit wall, said means comprising a pipe extendible through an aperture in said conduit wall and a concentric ridge formed around said pipe which in use bites into the outside of said conduit adjacent said aperture to prevent leakage at this point.

2. Apparatus as claimed in claim 1 wherein said spigot is attached to a control knob which is rotatable along a calibrated scale so as to enable a user to preselect the amount of additive passing through said metering device.

3. Apparatus as claimed in claim 2 wherein the bore is formed in the spigot and the tapered groove extends around the inner face of the seat, said bore being in direct communication with said small diameter pipe and said groove being in direct communication with said intake means.

4. Apparatus as claimed in claim 3 wherein said intake means comprises a bell shaped casing which houses a filter screen and is weighted to sit on the bottom of a supply reservoir of said additive.

5. Apparatus as claimed in claim 4 wherein said metering device is adapted to pass an antiseptic chemical such as liquid chlorine in amount suitable for domestic or public swimming pools.

6. Apparatus as claimed in claim 5 wherein said metering device is adapted to pass chemical additives of the type used with and in amounts suitable for agricultural irrigation systems.

7. Apparatus for introducing an additive into a conduit fluid stream, said apparatus including an intake means for drawing the additive from a supply thereof, a metering unit comprising a spigot rotatable within a seat to bring a bore into communication with a section of tapered groove whereby the relative position of said bore along the length of said groove determines the amount of additive passing through said unit and a clamp which in use engages the conduit and includes means for dispensing the additive through said conduit wall, said clamp comprising a U shaped saddle member which in use closely embraces said conduit and interfits with a housing so that a face of said housing is disposed substantially parallel to the axis of said conduit and said metering unit being disposed within said housing with said spigot being attached to a control knob rotatable along a scale on the face of the housing.

* * * * *